United States Patent [19]
Kang et al.

[11] Patent Number: 5,452,092
[45] Date of Patent: Sep. 19, 1995

[54] CHANGING PIXEL DETECTOR FOR CODING OF IMAGE DATA

[75] Inventors: Ku-Soo Kang; Seung-Beom Yang, both of Seoul; Kang-Young Lee, Suwon, all of Rep. of Korea

[73] Assignee: SamSung Electronics Co., Ltd., Suwon, Rep. of Korea

[21] Appl. No.: 186,092

[22] Filed: Jan. 25, 1994

[30] Foreign Application Priority Data

Jan. 28, 1993 [KR] Rep. of Korea .................. 01079

[51] Int. Cl.⁶ .................................... H04N 1/415
[52] U.S. Cl. ...................... 358/261.3; 358/427; 358/432; 358/448
[58] Field of Search .............. 358/448, 261.1, 261.3, 358/427, 432, 426; 382/56; 341/59, 65

[56] References Cited

U.S. PATENT DOCUMENTS

| | | |
|---|---|---|
| 3,723,641 | 3/1973 | Heinrich . |
| 3,849,592 | 11/1974 | Rosenhenl . |
| 3,909,515 | 9/1975 | Evansen . |
| 4,092,677 | 5/1978 | Saran . |
| 4,152,697 | 5/1979 | Rider . |
| 4,914,524 | 4/1990 | Doi . |
| 4,956,061 | 9/1990 | Nakamura . |
| 5,128,748 | 7/1992 | Murakami . |
| 5,196,945 | 3/1993 | Ho . |
| 5,235,430 | 8/1993 | Yakasu . |
| 5,365,347 | 11/1994 | Ozaki ........................... 358/261.1 |

*Primary Examiner*—Scott A. Rogers
*Attorney, Agent, or Firm*—Robert E. Bushnell

[57] ABSTRACT

A circuit is disclosed to simplify hardware of image transmission system such as a facsimile and also improve an encoding function. This circuit has a part for obtaining from a brightness change detector a brightness signal indicative of a change of brightness of binary valued data serially supplied from a data input part, and providing a detection load data to a storage part in response to generation of said detection signal. Accordingly, the storage part generates a within-line position value for said binary valued data having a change of brightness in response to the detection load data.

18 Claims, 5 Drawing Sheets

CHANGING PIXEL DETECTOR FOR CODING OF IMAGE DATA

BACKGROUND OF THE INVENTION

The present invention relates to a codec(coder/decoder) for encoding/decoding binary value data, i.e., image data obtained from a document in an image transmission system such as a facsimile machine, and more particularly to a changing pixel detector having a simplified structure and an improved encoding function.

Generally, an image transmission system, such as a facsimile machine, for transmitting data of document processes binary value data using MH(Modified Huffman: one-dimensional run-length encoding) and MR(Modified Read: one-dimensional and two-dimensional encoding) methods recommended by CCITT International Telegraph and Telephone Consultative Committee. The encoding according to the MH and MR methods is performed in units of line, and the binary value data is compressed based on position information of brightness changing pixels in each line. The MH method is known as a run-length coding used to generate a predetermined code word in a code word table according to white run and black run of binary value data. The MR method is for encoding data in one of vertical, horizontal and pass modes according to correlation of the brightness changing pixels between a previous line and a current line of data as recommended by CCITT T.4.

A codec adapted in an image transmission system to perform the encoding/decoding becomes ASIC Compatible because it has smaller size and lighter weight. Conventionally, a full hardware codec has been used in a public switched telephone network(PSTN). In this case, the speed of the encoding/decoding is higher than the transmission speed when the encoding/decoding is performed by the full hardware using a central processing unit having a slower processing speed. But, since Group III facsimiles need to keep a minimum scanning line time and a fixed transmission speed, the encoding/decoding speed has little advantage, compared to the case of having the equal transmission speed. Also, when the full hardware codec is used, there still exists the high cost of the whole system due to added hardware.

Meanwhile, if the MH and MR is performed by software, the encoding/decoding speed is slower than the transmission speed of encoded data through the PSTN, and accordingly, the transmission time becomes longer. Here, the reason for a longer transmission time is that the transmission side should transmit dummy data during the speed difference time.

SUMMARY OF THE INVENTION

Accordingly, it is an object of the present invention to provide a changing pixel detector that can solve the above conventional problems.

It is another object of the present invention to provide a changing pixel detector with an improved encoding function.

To achieve the objects, the changing element generator according to the present invention has: a data input part for receiving binary value data supplied from a bus, and serially supplying the binary value data according to a provided clock; a brightness change detector for generating a detection signal indicative of a change in brightness of the binary value data serially supplied from the data input past in response to a compared brightness (or brightness difference) signal and a start-of-line signal supplied; a storage part for storing a within-line position value for the binary value data having a change of brightness in response to detection load data; a register part having a start flag and an end flag for storing output position data of the binary value data supplied via a data bus, and supplying to the brightness difference signal and the start-of-line signal provided via the data bus to the brightness change detector; a counter for providing a within-line position value of the binary value data by counting the output position data in response to a counting clock, and supplying an overflow signal when the counting of the output position data reaches a predetermined count value; and a signal generator for generating a counting clock by processing a system clock, generating a DMA request signal for enabling the data input part to receive the binary value data upon reception of a overflow signal supplied the position counter, operating the brightness change detector in response to a status value of the start flag, and providing detection load data to the storage part in response to generation of the detection signal indicative in a change of brightness of the binary value data.

According to the above constitution of the present invention, position information of the binary value data having a change of brightness within a line of a document is supplied by hardware from the storage part. Accordingly, a controller of the image transmission system can sufficiently perform by software the encoding or decoding according to the MH and MR methods using the position information. The performance of encoding or decoding by interaction of the changing pixel detector and the controller according to the present invention can be maintained with 1/5 of the gates needed in case of using the conventional full hardware method. This becomes an important factor to reduce the manufacturing cost of the system.

BRIEF DESCRIPTION OF THE DRAWINGS

The above objects and other advantage of the present invention will become more apparent by describing the preferred embodiment of the present invention with reference to the attached drawings, in which.

DETAILED DESCRIPTION OF THE INVENTION

In the following description, numerous specific details are set forth to provide a more thorough understanding of the present invention. It will be apparent, however, to one skilled in the art, that the present invention may be practiced without these specific details. In other instances, well known circuits has not been described so as not to obscure the present invention.

Figure 1:
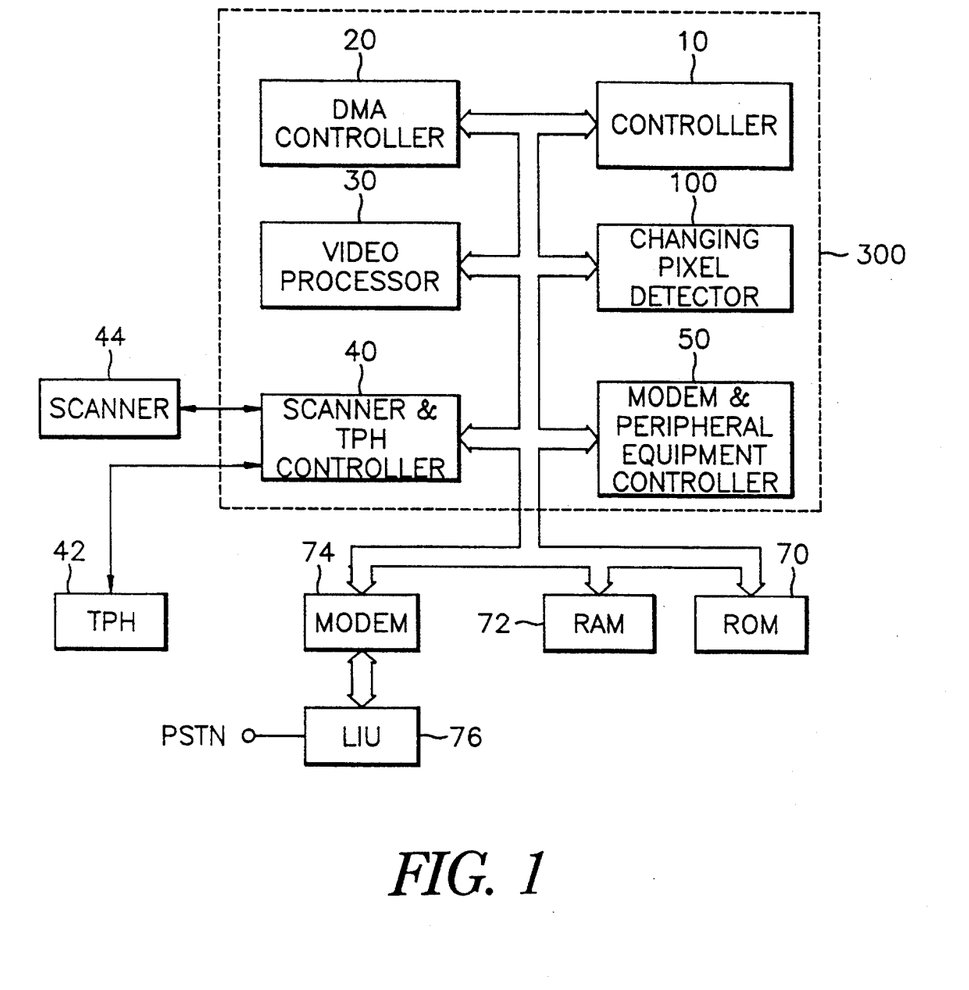
FIG. 1 is a block diagram of a facsimile system applied to the present invention.
Figure 3:
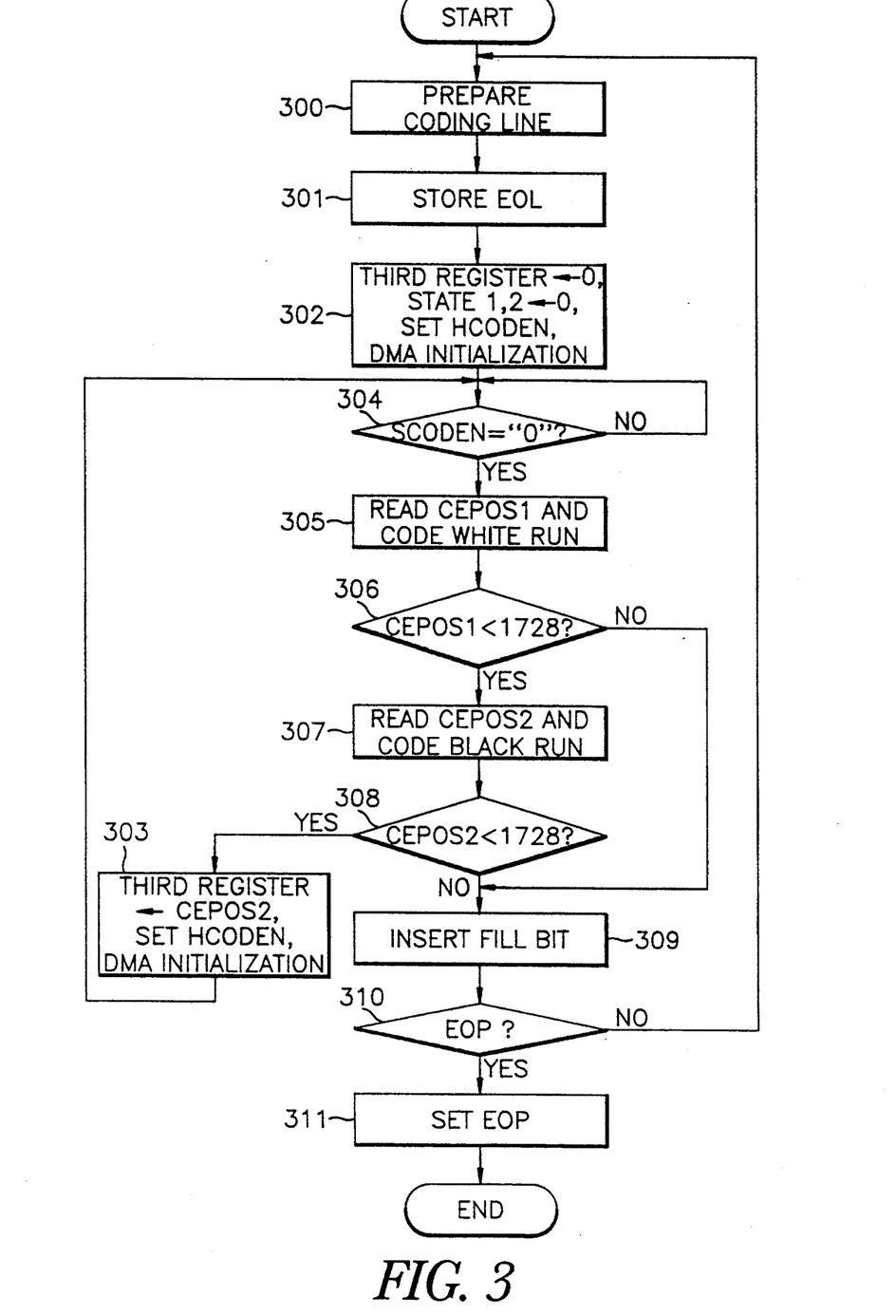
FIG. 3 is a control flow chart for one-dimensional encoding using the changing pixel detector of the present invention.
Figure 4A:
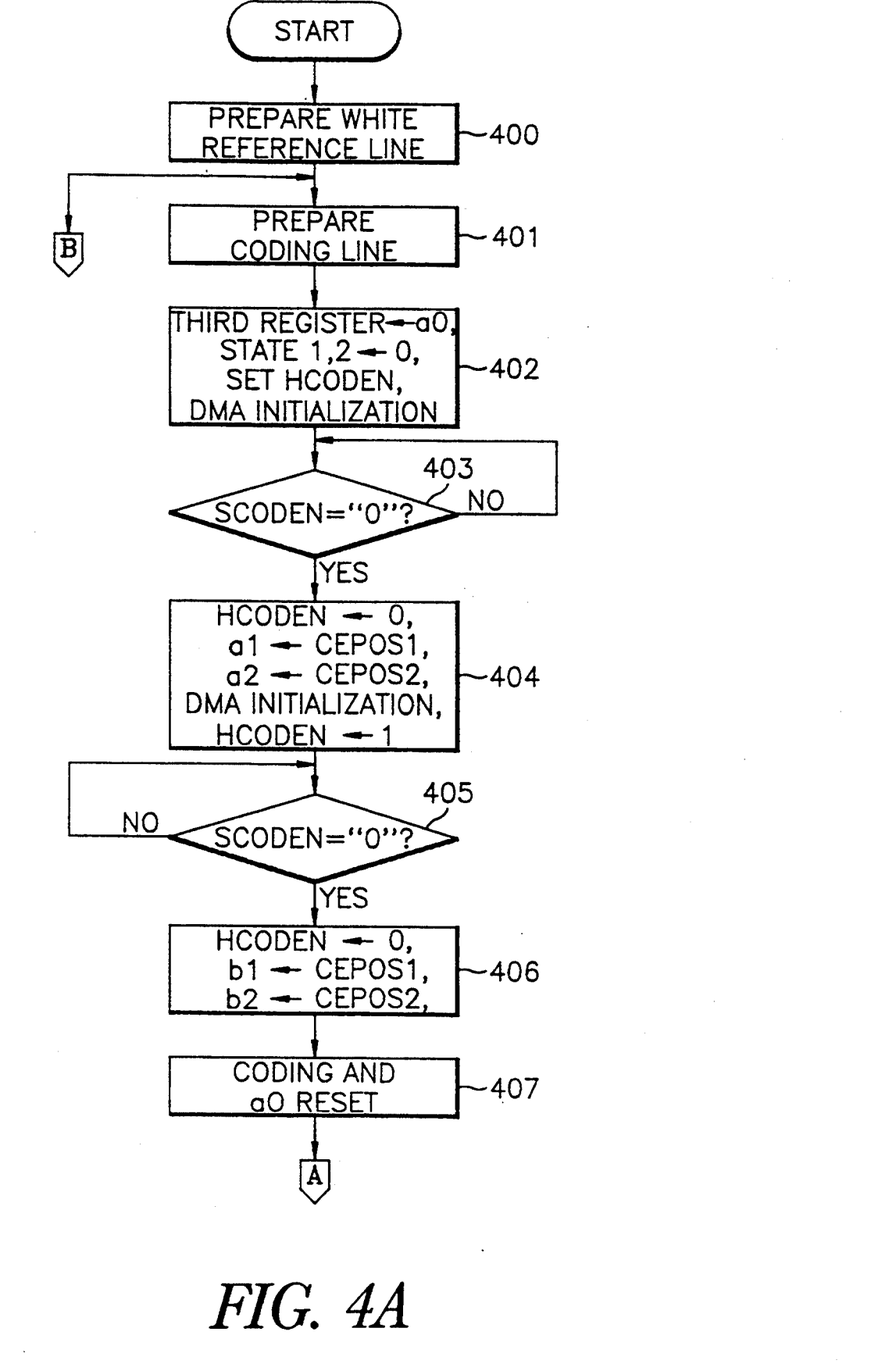
FIGS. 4A and 4B are a control flow chart for one-dimensional and two-dimensional encoding using the changing pixel detector of the present invention.
Figure 4B:
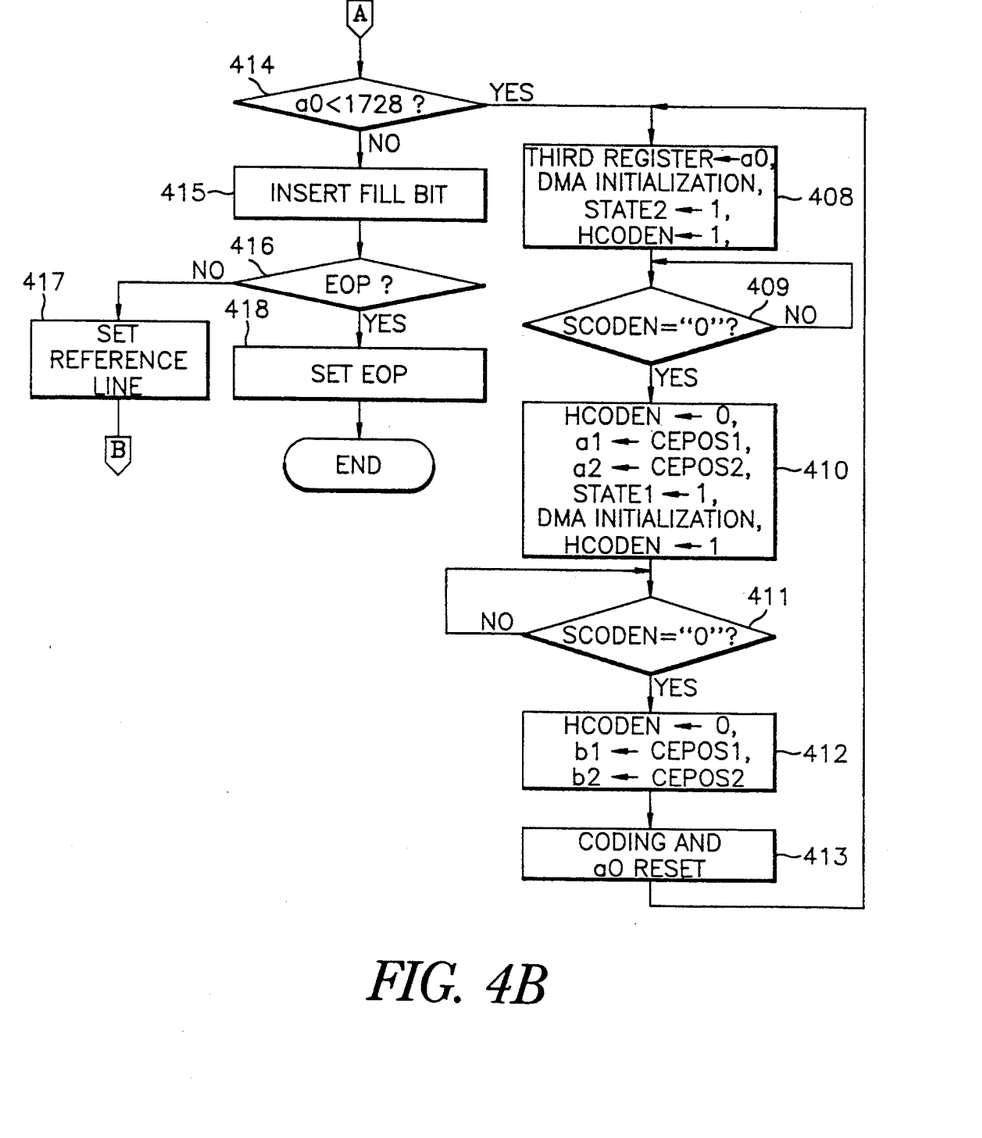

Turning now to FIG. 1, a block diagram of a facsimile system where the present invention is applied is illustrated. The facsimile system has an integrated controller 300 for accessing a predetermined program to control all of the operations following the function of system and perform several operations needed for the transmission of document data, a scanner 44 for scanning an input document under the control of the integrated controller 300 to generate an analog video signal and converting the analog video signal to digital binary value data, a TPH 42 for recording the binary value date stored in a RAM72, a modem 74 for modulating the binary value data during transmission and demodulating a demodulated video signal supplied from another system into the binary value data, a ROM 70 for storing a program the integrated controller 300, a RAM 72 which is a working memory, and a line interface unit 76. The constitution shown in FIG.1 is a general block diagram of a facsimile system except for a changing pixel detector 100 within the integrated controller 300. A controller 10 within the integrated controller 300 performs the encoding and decoding by accessing the ROM 70 including a program, which is obtained by programming the procedures as shown in FIGS. 3, 4A and 4B with a programming language. It is a general technique to program the control procedures of FIGS. 3, 4A and 4B and the content of sentence can be simplified by the generally used C language.

Figure 2:
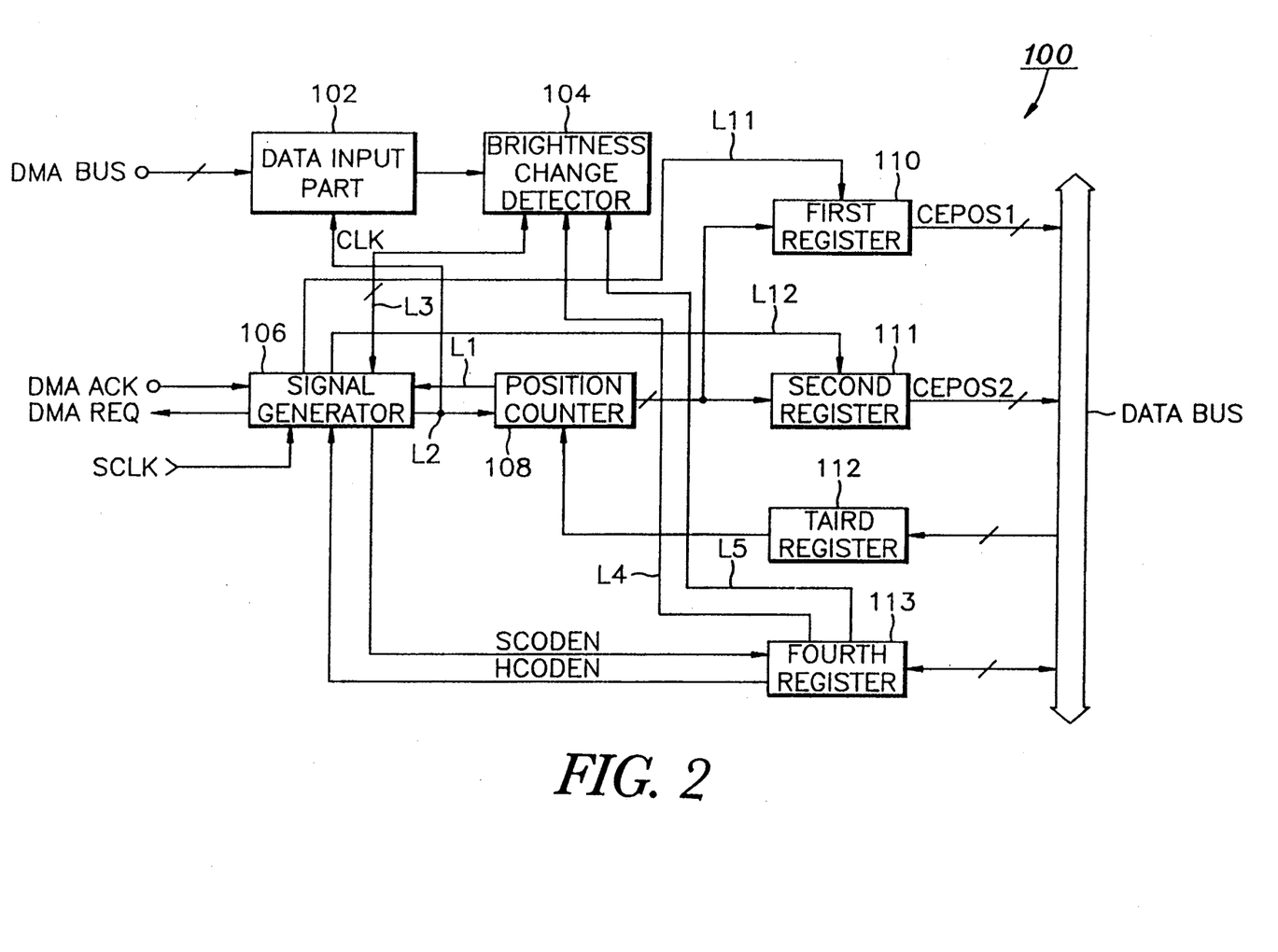
FIG. 2 is a circuit block diagram of a changing pixel detector shown in FIG. 1 according to the present invention.

The changing pixel detector 100 in FIG. 1 is the circuit to be implemented in the present invention, and its detailed circuit block diagram is shown in FIG. 2.

Turning now to FIG.2, the changing pixel detector 100 includes a data input part 102, a brightness change detector 104, a signal generator 106, a position counter 108, and first, second, third and fourth registers 110 to 113. The data input part 102 is connected to a DMA controller 20 through a DMA bus, and the signal generator 106 is connected to the DMA controller 20 through a DMA signal line. The first to fourth registers 110 to 113 are connected to the DMA controller 10 through each data bus. The brightness change detector 104 is connected to an output terminal of the data input part 102, and is connected to the signal generator 106 through line L3, and receives a brightness difference signal and a start-of-line signal supplied through lines L4 and L5, respectively. The first and second registers 110 and 111 store a position value for each of document line supplied from the position counter 108, in response to detection load data provided from the signal generator 106 through lines L11 and L12, respectively. The position counter 108 counts output position data of binary value data provided from the third register 112 in response to a clock supplied through line L2, thereby generating the position value, which is data indicating where the brightness of the binary value data within a processing line of a document is changed. Also, the position counter 108 generates a byte overflow signal when the counting exceeds a predetermined value. The fourth register 113 has its own start flag and end flag, for supplying the brightness difference signal and the start-of-line signal provided through the data bus to the brightness change detector 104. The status of the start flag within the fourth register 113 is provided as HCODEN signal to the signal generator 106. A signal SCODEN generated from the signal generator 106 is supplied to the end flag within the fourth register 113. The signal generator 106 processes a system clock SCLK to generate the clock CLK, receives the byte overflow signal from the position counters 108 through line L1 to generate a request signal DMA REQ for enabling the data input part 102 to receive the binary value data through the DMA bus, and receives a request acknowledging signal DMA ACK as a response to the request signal. Also, the signal generator 106 enables the brightness change detector 104 through line L3 to respond to the status value of the start flag, i.e., HCODEN. The signal generator 106 also provides the detection load data to the first and second registers 110 and 111 in response to the generation of the detection signal indicative of the brightness variation of binary value data through the line L3. The data input part 102 receives in units of byte the binary value data supplied from the data bus and generates the binary value data serially according to the clock CLK. The within-line position value respectively stored in the first and second registers 110 and 111 are called position information CEPOS1 and CEPOS2, respectively. The controller 10 of FIG. 1 fetches the position information CEPOS1 and CEPOS2 through the data bus, to perform encoding or decoding of an image signal of a document according to the MH and MR methods.

That is, the circuit of FIG. 2 according to the embodiment of the present invention is hardware for providing position information of reference pixels needed for an actual encoding/decoding. The circuit of FIG. 2 is operated by the controller 10, and its operation is started when the output position data in a processing line (start-of-detection position data), a brightness difference signal and a start-of-line signal are supplied through the data bus. If the start-of-line signal is provided as a binary zero, logic zero is supplied to the brightness change detector 104 through the output line L5 of the fourth register 113. Accordingly, the brightness detector 104 compares by one pixel data from the output position data of the binary value data the brightness value of the binary value data and the brightness difference signal until two changing pixels are found. Accordingly, the binary value data having the variation of brightness can be detected, and a detection signal indicating that there is a change of brightness supplied through line L3. The detection signal is converted into detection load data by the signal generator 106, and the detection load date is then delivered to the first and second registers 110 and 111. At this time, the detection load data indicative of a first change of brightness of the binary value data is provided to the first register 110 through line L11, and the detection load data indicative of a second change is provided to the second register 111 through line L12. Accordingly, the first register 110 loads the counting value of the position counter 108 in response to the load detection data. Accordingly, the value stored in the first register 110 is a position value of the binary value data having the first change of brightness within the processing line. Similarly, the value stored in the second register 111 is a position value of the binary value data having the second change of brightness, within the processing line.

Meanwhile, when the start-of-line signal has logic a 1, the brightness data of a previous pixel and a current pixel representative of binary value data are compared with each other by the brightness change detector 104. Accordingly, if there exists a variation of brightness value, the current binary value data which is an object to be processed is detected as a changing pixel. Here, the detection is started from the second input binary value data.

When the brightness change detector 104 completes the detection for brightness variation of binary value data within a processing line of a document, the signal generator 106 receives the end-of-detection through line L3 and generates a SCODEN signal. Accordingly, the end flag within the fourth register 113 is set, so that the controller 10 recognizes the completion of detection. The controller 10 performs encoding/decoding using the within-line position value of the binary value data stored in the first and second registers 110 and 111.

Here, it is preferred that the start-of-line signal has value a binary value zero in the processing an initial line, and then has value 1. The start signal generator 106 includes a gate for AND-gating the start flag signal and a short pulse, and a latch element for receiving the AND output of the gate as a clock and generating the DMA request signal. Also, the position counter 108 is a 11-bit counter comprising 3-bit and 8-bit counters, when a total number of binary value data within one horizontal scan line is 1728 pixels.

The procedure of one-dimensional encoding using the changing pixel detector 100 is shown in FIG. 3, and the procedure of one-dimensional and two-dimensional encoding is shown in FIG. 4A and 4B.

With reference to FIG.3, to perform one-dimensional encoding, the controller 10 prepares a line to be coded in step 300, and stores an end-of-line(EOL) in signal its own register in step 301. In step 302, the controller 10 supplies a logic signal zero to the third register 112 of FIG. 2 and supplies first and second state signals to the fourth register 113. Here, the first state signal is used to enable the fourth register 113 to generate a brightness difference signal of the binary value data, and the second state signal is used to enable the fourth register 113 to generate a signal start-of-line signal, If the first state signal is a binary zero, an operation of searching the first changing pixel within the processing line is performed, and if the first state signal is 1, an operation of searching the second changing pixel is continuously performed. And, if the second state signal is a binary zero, compared brightness value represents white and if the second state is 1, the compared brightness value represents black. Also, in step 302, the start flag HCODEN is set and DMA initialization is completed. Accordingly, the changing pixel detector 100 starts to operate by performance of step 302. The controller 10 accesses the fourth register 113 through a data bus to check whether the value of end the flag is a binary zero, in step 304. If the value of the end flag is a binary zero, the position value stored in the first register 110 is read and white run is coded in step 305. It is checked in step 306 whether the position value becomes the value indicative of the end of line. If the one-line processing is ended, the controller 10 reads the position value stored in the second register 111 and codes the black run, in step 307. In this field, the black run and white run coding is well known. If the end of line is detected in step 308, step 303 is performed and then step 304 is performed again. In step 303 the controller 10 puts the position value stored from the second register 111 in the third register 112, sets the start flag, and performs a DMA initialization. If the end of line has not been checked in step 308, fill-bit is inserted in step 309, and the end-of-page is checked in step 310. The end-of-page is a flag indicative of completion of the of one processing document. If it is not the end-of-page in step 310, step 300 is again performed, and if it is the end, the end of page is set. It can be known that the MH encoding is achieved by performing the above-mentioned steps 300 to 311, and the controller 10 uses the position values stored in the first and second registers 110 and 111.

FIGS. 4A and 4B illustrates a control flow chart of one-dimensional and two-dimensional encoding using the changing pixel detector shown in FIG. 2. The steps shown in FIGS 4A and 4B are performed when it is assumed that all of the lines are encoded in two dimensions, and the same reference numerals described in FIG. 3 are used. Also, a0 represents the position of pixel data on the coding line to be currently encoded, a1 represents the position of next changing pixel data with respect to the position a0 on the coding line, and a2 represents the position of next changing pixel data with respect to a1 on the coding line. Also, b1 represents the position of changed pixel data in the previous coding line (i.e., reference coding line) of the a0, and b2 represents the next changed position of pixel data in the previous coding line after b1. The steps 400 to 417 shown in FIGS. 4A and 4B can be well understood by those skilled in this field with reference to the aforementioned description and the description of FIG.3.

The program list for actual performance of the above steps is stored in the ROM 70. Accordingly, the controller 10 can perform the further improved encoding by performing the steps of FIGS. 3, 4A and 4B with the changing pixel detector 100 of FIG. 2.

As described above, according to the present invention, the circuit preventing the picture from being deteriorated and also having a simplified constitution compared to the conventional codec can be constituted, thereby reducing the cost of product.

While the invention has been particularly shown and described with reference to preferred embodiments thereof, it will be understood by those skilled in the art that the foregoing and other changes in form and details can be made therein without departing from the spirit and scope of the invention.

What is claimed is:

1. In a codec for performing encoding and/or decoding in an image transmission system, a circuit comprising:

data input means for receiving binary valued data supplied from bus, and serially supplying said binary value data according to a provided clock;

brightness change detecting means for generating a detection signal indicative of a change of brightness of said binary valued data serially supplied from said data input means in response to a brightness difference signal and a start-of-line signal supplied;

storage means for storing a within-line position value for said binary valued data having a change of brightness in response to detection load data;

register means for storing output position data of said binary valued data supplied via data bus, having its own start flag and end flag, and supplying to said brightness change detecting means said brightness difference signal and said start-of-line signal provided via said data bus;

counting means for providing a within-line position value of said binary valued data by counting said output position data in response to a supplied clock, and supplying an overflow signal generated during said counting; and signal generating means for generating said clock by processing a system clock, generating a request signal for making said data input means receive said binary valued data by receiving said overflow signal, operating said brightness change detecting means in response to a status value of said start flag, and providing said detection load data to said storage means in response to generation of said detection signal indicative of a change of brightness of said binary valued data.

2. The circuit as claimed in claim 1, wherein said within-line position values are used in encoding, since said codec is operated together with a controller of a facsimile system.

3. The circuit as claimed in claim 1, wherein said counting means is composed of a 11-bit counter to generate a byte overflow signal.

4. A document image processing apparatus for processing document image data including color images as digital data, comprising:

an image scanner for scanning pixels forming a visual pattern of a document to produce document image data;

means for converting said document image data into binary value data having a predetermined number of serial pixels for each of a plurality of successive scan lines, said binary value data having a first level representing a white pixel and a second value representing a black pixel;

pixel detector means for detecting changing pixels of said binary value data when said binary value data alternates between said first level and said second level within each of said scan lines, counting occurrences of said changing pixels of said binary value data and storing positional data corresponding to said changing pixels of said binary value data;

memory means comprising programs for enabling coding of said binary value data in accordance with one of an one-dimensional coding scheme and a two-dimensional coding scheme; and coder means for coding said binary value data in one of said one-dimensional coding scheme and said two-dimensional coding scheme by using said positional data corresponding to said changing pixels of said binary value data.

5. The document image processing apparatus as claimed in claim 4, wherein said changing pixel detector means comprises:

means for receiving said binary value data;

brightness detector means for generating a detection signal by detecting said changing pixels for each scan line of said document when said binary value data alternates between said first level and said second level within each scan line, in response to reception of a brightness difference signal, and a start-of-line signal indicative of a beginning of each scan line of said document;

first register means for storing said positional data at a first changing pixel within each scan line indicative of said first level representing said white pixel, and producing said positional data at said first changing pixel in response to first detection data when said binary value data alternates from said first level to said second level within said scan line;

second register means for storing said positional data at a second changing pixel within each scan line indicative of said second level representing said black pixel, and producing said positional data at said second changing pixel in response to second detection data when said binary value data alternates from said second level to said first level within said scan line;

third register means for storing output positional data provided from said coder means after said coder means coded said binary value data using said positional data at said second changing pixel within each scan line;

fourth register means having a start flag and an end flag, for enabling transmission of said brightness difference signal and said start-of-line signal provided from said coder means to said brightness detector means;

position counter means for counting said output positional data of said binary value data in response to a first clock to provide said positional data at successive changing pixels within each scan line indicative of said first and second levels representing said white and black pixels, respectively; and signal generator means for generating said first and second detection data in response to said detection signal.

6. The document image processing apparatus as claimed in claim 5, wherein said position counter means comprises a 11-bit counter generating an overflow signal when counting a total number of pixels of each scan line exceeds 1728.

7. The document image processing apparatus as claimed in claim 5, wherein said coder means, in said one-dimensional coding scheme, reads said positional data at said first changing pixel within each scan line for coding said binary value data in successive series of white run length code words, and reads said positional data at said second changing pixel within each scan line for coding said binary value data in successive series of black run length code words.

8. The document image processing apparatus as claimed in claim 7, wherein said coder means, in said one-dimensional coding scheme, further inserts fill-in bits between a scan line and an end of each scan line for equalizing the transmission time of said binary value data and the coding of said binary value data.

9. The document image processing apparatus as claimed in claim 7, wherein said coder means, in said two-dimensional coding scheme, codes said binary value data using said positional data between a reference line and a coding line representative of two successive scan lines of said binary value data in one of a pass mode, a vertical mode and a horizontal mode.

10. A changing pixel detector for a facsimile comprising programs for enabling encoding of binary image data of a visual pattern of a document, and coder means for coding said binary image data in one of an one-dimensional coding scheme and a two-dimensional coding scheme, said changing pixel detector comprising:

means for receiving said binary image data of a predetermined number of serial pixels for each of a plurality of successive scan lines, said binary value data having a first level representing a white pixel and a second value representing a black pixel;

brightness detector means for generating a detection signal by detecting changing pixels for each scan line of said document when said binary value data alternates between said first level and said second level within each scan line, in response to reception of a brightness difference signal, and a start-of-line signal indicative of a beginning of each scan line of said document;

a first register for storing said positional data at a first changing pixel within each scan line indicative of said first level representing said white pixel, and producing said positional data at said first changing pixel in response to first detection data when said binary value data alternates from said first level to said second level within said scan line;

a second register for storing said positional data at a second changing pixel within each scan line indicative of said second level representing said black pixel, and producing said positional data at said second changing pixel in response to second detection data when said binary value data alternates from said second level to said first level within said scan line;

a third register for storing output positional data provided from said coder means after said coder means coded said binary value data using said positional data at said second changing pixel within each scan line;

a fourth register for enabling transmission of said brightness difference signal and said start-of-line signal provided from said coder means to said brightness detector means;

a position counter for counting said output positional data of said binary value data in response to a first clock to provide said positional data at successive changing pixels within each scan line indicative of said first and second levels representing said white and black pixels, respectively; and signal generator means for generating said first and second detection data in response to said detection signal.

11. The changing pixel detector as claimed in claim 10, wherein said position counter means comprises a 11-bit counter generating an overflow signal when counting a total number of pixels of each scan line exceeds 1728.

12. The changing pixel detector as claimed in claim 10, further comprising encoder/decoder means for coding of said binary value data in one of a Modified-Huffman coding scheme and a Modified-Read coding scheme using said positional data on said pixel corresponding to the changing points of said binary value data.

13. The changing pixel detector as claimed in claim 12, wherein said encoder/decoder means, in said Modified-Huffman coding scheme, reads said positional data at said first changing point within each scan line for coding said binary value data in successive series of white run length code word, and reads said positional data at said second changing point within each scan line for coding said binary value data in successive series of black run length code word.

14. The changing pixel detector as claimed in claim 13, wherein said encoder/decoder means, in said Modified-Huffman coding scheme, further inserts fill-in bits between a scan line and an end of each scan line for equalizing the transmission time of said binary value data and the coding of said binary value data.

15. A method for detecting changing pixels in a facsimile comprising an image scanner for scanning pixels forming a visual pattern of a document to produce document image data, means for converting said document image data into binary value data having a predetermined number of serial pixels for each of a plurality of successive scan lines, said binary value data having a first level representing a white pixel and a second value representing a black pixel, and coder means for coding said binary value data by using positional data corresponding to changing pixels of said binary value data, said method for detecting changing pixels comprising the steps of:

receiving said binary image data of a predetermined number of serial pixels for each of a plurality of successive scan lines of said document, said binary value data having a first level representing a white pixel and a second value representing a black pixel;

generating a detection signal by detecting said changing pixels in each scan line of said document when said binary value data alternates between said first level and said second level within each scan line, in response to reception of a brightness difference signal, and a start-of line signal indicative of a beginning of each scan line of said document;

storing said positional data at a first changing pixel within each scan line indicative of said first level representing said white pixel, and producing said positional data at said first changing pixel in response to first detection data when said binary value data alternates from said first level to said second level within said scan line;

storing said positional data at a second changing pixel within each scan line indicative of said second level representing said black pixel, and producing said positional data at said second changing pixel in response to second detection data when said binary value data alternates from said second level to said first level within said scan line;

storing output positional data provided from said coder means after said coder means coded said binary value data using said positional data at said second changing pixel within each scan line;

counting said output positional data of said binary value data in response to a first clock to provide said positional data at successive changing pixels within each scan indicative of said first and second levels representing said white and black pixels, respectively; and generating said first and second detection data in response to said detection signal.

16. The method for detecting changing pixels as claimed in claim 15, further comprised of said coder means coding of said binary value data in one of a Modified-Huffman coding scheme and a Modified-Read coding scheme using said positional data corresponding to said changing pixels of said binary value data.

17. The method for detecting changing pixels as claimed in claim 16, wherein said coder means, in said Modified-Huffman coding scheme, reads said positional data at said first changing pixel within each scan line for coding said binary value data in successive series of white run length code words, and reads said positional data at said second changing pixel within each scan line for coding said binary value data in successive series of black run length code words.

18. The method for detecting changing pixels as claimed in claim 17, wherein said coder means, in said Modified-Huffman coding scheme, further inserts fill-in bits between a scan line and an end of each scan line, for equalizing the transmission time of said binary value data and the coding of said binary value data.

* * * * *

UNITED STATES PATENT AND TRADEMARK OFFICE
CERTIFICATE OF CORRECTION

PATENT NO. : 5,452,092
DATED : September 19, 1995
INVENTOR(S) : Ku-Soo Kang

It is certified that error appears in the above-indentified patent and that said Letters Patent is hereby corrected as shown below:

Column 5,    Line 34,    before "start" delete "signal":

Signed and Sealed this

Twelfth Day of August, 1997

Attest:

BRUCE LEHMAN

Attesting Officer

Commissioner of Patents and Trademarks